United States Patent [19]

Birch

[11] 4,308,539

[45] Dec. 29, 1981

[54] COMPENSATED PHASED ARRAY ANTENNA

[75] Inventor: James D. Birch, Townsend, Mass.

[73] Assignee: Raytheon Company, Lexington, Mass.

[21] Appl. No.: 109,442

[22] Filed: Jan. 4, 1980

Related U.S. Application Data

[63] Continuation of Ser. No. 973,323, Dec. 26, 1978, abandoned.

[51] Int. Cl.[3] .............................................. H04B 7/00

[52] U.S. Cl. .............................. 343/100 SA; 343/854; 343/114

[58] Field of Search .................. 343/100 SA, 854, 114

[56] References Cited

U.S. PATENT DOCUMENTS 3,611,401 10/1971 Connolly ............................ 343/854

3,885,237 5/1975 Kirkpatrick ................. 343/100 SA

*Primary Examiner*—Theodore M. Blum

*Attorney, Agent, or Firm*—Philip J. McFarland; Joseph D. Pannone

[57] ABSTRACT

A compensated phased array antenna is shown wherein the drive to each one of a plurality of phase shifters is changed to compensate for changes in operating conditions.

1 Claim, 1 Drawing Figure

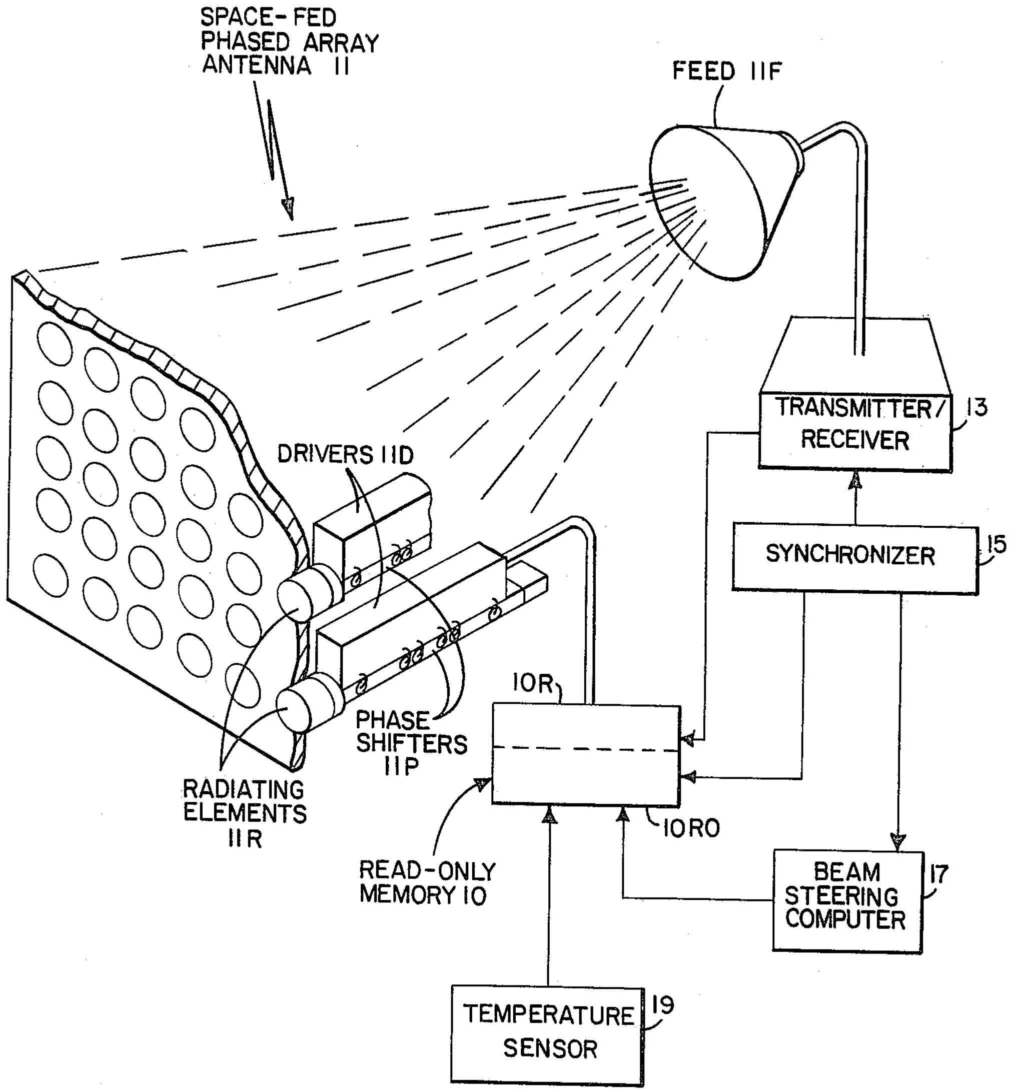
SPACE-FED PHASED ARRAY ANTENNA 11
FEED 11F
TRANSMITTER/ RECEIVER
13
DRIVERS 11D
SYNCHRONIZER
15
10R
PHASE SHIFTERS 11P
RADIATING ELEMENTS 11R
10RO
READ-ONLY MEMORY 10
BEAM STEERING COMPUTER
17
TEMPERATURE SENSOR
19

COMPENSATED PHASED ARRAY ANTENNA

CROSS-REFERENCE TO RELATED CASES

This is a continuation of application Ser. No. 973,323, filed Dec. 26, 1978, now abandoned.

BACKGROUND OF THE INVENTION

This invention pertains generally to phased array antennas using a plurality of radiating elements and particularly to antennas of such type wherein collimation and steering of a beam of electromagnetic energy is accomplished by controlling phase shifters in circuit with the radiating elements.

It is known in the art that the efficacy of a steerable phased array antenna under field conditions is largely dependent upon the characteristics of the phase shifters incorporated in such an antenna. That is to say, whether ferrite or diode phase shifters are used, variations between such devices due to different ambient temperatures and operating frequencies and to manufacturing tolerances combine to limit the accuracy of collimation and steering.

It has long been customary to select phase shifters for an array and then to compensate for manufacturing tolerances by "trimming" whereby the electrical length of the transmission line to each radiating element is adjusted. Such a compensation then is effective to optimize operation under a predetermined condition, but is not effective when changes in temperature or frequency are experienced. In addition, because individual phase shifters may fail in operation, it is necessary to maintain a reserve of similar phase shifters.

SUMMARY OF THE INVENTION

With the foregoing background of the invention in mind, it is a primary object of this invention to provide improved control circuitry for the phase shifters in a phased array antenna whereby compensation for changes in operational conditions may be automatically effected.

The foregoing and other ojects to become evident are met generally by providing, in addition to a conventional beam steering computer which provides the basic collimating and steering signals to the phase shifters in a phased array antenna, a read-only memory programmed to produce compensating signals in accordance with changes in actual operating conditions affecting the phase shifters and means for combining the basic collimating and steering signals with the compensating signals to produce control signals for the phase shifters.

BRIEF DESCRIPTION OF THE DRAWING

For a more complete understanding of this invention, reference is now made to the following description of a preferred embodiment of this invention illustrated in the accompanying drawing, the single FIGURE of which is a block diagram of a system using a phased array antenna controlled as herein contemplated.

DESCRIPTION OF THE PREFERRED EMBODIMENT

Referring now to the FIGURE, it may be seen that the arrangement of a system according to this invention is, except for the incorporation of a read-only memory assembly 10 and condition sensing units, conventional. Thus, the illustrated system here includes a space-fed phased array antenna 11, a transmitter/receiver 13, a synchronizer 15 and a beam steering computer 17. The space-fed phased array antenna 11 includes a feed 11F and an array of radiating elements 11R and a like array of phase shifters 11P with drivers llD. It will be recognized that the just-mentioned elements (except for the read-only memory assembly 10) constitute a conventional system such as that shown and described in U.S. Pat. No. 3,639,863. Here, however, the read-only memory assembly 10 is disposed between the beam steering computer 17 and the drivers llD.

The read-only memory assembly 10 here comprises a register 10R having a first and a second section (not numbered), and a read-only memory 10RO addressed by the output of a temperature sensor 19 along with signals from the transmitter/receiver 13 and the synchronizer 15, which signals are indicative, respectively, of ambient temperature, the frequency of the transmitted signal and the mode of operation (transmit or receive) of the transmitter/receiver 13. The output of the read-only memory 10RO is impressed on the second section of the register 10R.

In operation, then, the basic collimating and steering signals out of the beam steering computer 17 (which signal is in the first section of the register 10R) and the output of the read-only memory 10RO (which output is in the second section of the register 10R) are applied as a compensated control signal to the drivers 11D. Therefore, the drive signals to the phase shifters 11P may be made independent of operating conditions.

It will be appreciated that the read-only memory 10RO be programmed to compensate for factors other than variation in insertion phase with temperature. That is to say, each one of the phase shifters 11P to be used in the space-fed phased array antenna 11 may be tested in any known manner prior to installation to determine deviation (if any) from design characteristics due to manufacturing tolerances. The programming of the read-only memory 10RO then could be adjusted so that the drive signals to the drives 11D would compensate for any such deviation. In other words, even though variation in the characteristics of the individual phase shifters 11P would still be present, appropriate adjustments in the drive signals to each such shifter would make it appear that perfectly matched phase shifters were used. It will also be appreciated that compensation for other characteristics of phase shifters may be effected by modifying the preferred embodiment just described. Thus, if it is desired to compensate for the effects of mutual coupling between radiating elements, the read-only memory may be appropriately programmed. In view of the foregoing it is felt that this invention should not be restricted to its disclosed embodiment, but rather should be limited only by the spirit and scope of the appended claims.

What is claimed is:

1. In a radar using a phased array antenna incorporating a phase shifter in the path of electromagnetic energy to each radiating element of such antenna, each such phase shifter being individually controllable by a driver and having electromagnetic characteristics which change with ambient temperature, the improvement comprising:

(a) means for adjusting the control signal to each driver to compensate for any change in the electromagnetic characteristics of the associated phase shifter due to change in ambient temperature, such means comprising a read-only memory addressable by a signal indicative of ambient temperature correspondingly to adjust the control signal to each one of the drivers thereby separately to compensate each one of the phase shifters for any change in ambient temperature; and (b) means for producing the signal indicative of ambient temperature.

* * * * *